(12) United States Patent
Stobbe et al.

(10) Patent No.: US 6,535,744 B1
(45) Date of Patent: Mar. 18, 2003

(54) SYSTEM FOR THE SPATIAL ALLOCATION OF AT LEAST ONE TRANSPONDER TO THE CELLS OF A DETECTION AREA, BASE STATION, AND TRANSPONDER

(75) Inventors: Anatoli Stobbe, Steinradweg 3, D-30890 Barsinghausen (DE); Holger Merk, Barsinghausen (DE)

(73) Assignee: Anatoli Stobbe, Barsinghausen (DE)

( * ) Notice: Subject to any disclaimer, the term of this patent is extended or adjusted under 35 U.S.C. 154(b) by 0 days.

(21) Appl. No.: 09/473,362

(22) Filed: Dec. 28, 1999

(51) Int. Cl.[7] ................................ H04Q 7/20
(52) U.S. Cl. ........................ 455/456; 455/443
(58) Field of Search ................ 455/456, 443; 340/825, 825.36, 825.49, 10.1, 572.1, 572.2

(56) References Cited

U.S. PATENT DOCUMENTS

| | | | |
|---|---|---|---|
| 4,302,846 A | * 11/1981 | Stephen et al. | 340/572.2 |
| 5,506,584 A | * 4/1996 | Boles | 342/42 |
| 5,581,257 A | * 12/1996 | Greene et al. | 235/375 |
| 5,929,780 A | * 7/1999 | Pagnol et al. | 340/10.51 |
| 6,057,756 A | * 5/2000 | Engellenner | 235/385 |
| 6,104,285 A | * 8/2000 | Stobbe | 340/505 |
| 6,249,227 B1 | * 6/2001 | Brady et al. | 340/572.1 |
| 6,333,690 B1 | * 12/2001 | Nelson et al. | 340/539 |
| 2001/0011954 A1 | * 8/2001 | Shelton et al. | 340/825.49 |

FOREIGN PATENT DOCUMENTS

| | | |
|---|---|---|
| DE | 197 30 595 | 11/1998 |
| DE | 198 04 185 | 8/1999 |
| WO | WO 95/28691 | 10/1995 |

OTHER PUBLICATIONS

"Providing Universal Location Services Using . . . ", by J.M. Zagami et al, IEEE Communications Magazine, Apr. 1998, pp. 66–71.

* cited by examiner

Primary Examiner—Vivian Chin
Assistant Examiner—Tu X Nguyen
(74) Attorney, Agent, or Firm—Collard & Roe, P.C.

(57) ABSTRACT

A system is described for the spatial allocation of at least one transponder to cells of a detection area. The cells of the detection area differ by changeable or permanently different properties of an electromagnetic field. By means of the transponder, the properties of the electromagnetic fields of the cells which are capable of reception individually, selectively, or resultantly, are evaluated. Allocation to the cells is effected automatically according to the properties of the individual electromagnetic fields received, or according to the ratio of the proportions of the electromagnetic fields received selectively or resultantly, or according to the proportion predominating in the field strength of the electromagnetic fields received selectively or resultantly.

23 Claims, 2 Drawing Sheets

SYSTEM FOR THE SPATIAL ALLOCATION OF AT LEAST ONE TRANSPONDER TO THE CELLS OF A DETECTION AREA, BASE STATION, AND TRANSPONDER

BACKGROUND OF THE INVENTION

1. Field of the Invention

The invention relates to a system for the spatial allocation of at least one transponder to the cells of a detection area. More particularly, the invention relates to a system where the cells differ from one another by changeable or permanently different properties of an electromagnetic field.

2. The Prior Art

Transponders are mobile electronic switching circuits, which serve primarily for the identification of persons, animals, or objects, and allow for data exchange with a base station without contact. Transponders are also used to track moving objects for logistical purposes or for securing items of value.

With the application situations known hitherto, the spatial allocation of the transponder was effected by way of identification by means of a base station, in the range of which the transponder was located. This arrangement was restricted to the more immediate vicinity of an area created by an antenna of the base station. There was a need for spatial identification also to be achieved in a larger area than the range of a base station antenna.

In principle, the method of determining the position of mobile receiver devices is known. Thus, for example, the GSM mobile radio network is subdivided into radio cells, to which fixed-position radio stations are allocated. The mobile telephone receives several transmitting stations simultaneously in time slots and on different reception frequencies. The telephone then creates a connection with a particular radio station, or changes to another radio station with which the best possible radio transmission is guaranteed.

A mobile telephone also monitors fixed signaling zones for the purpose of signaling incoming calls. A message is passed to the network as soon as the mobile telephone switches to an adjacent signaling zone. In this situation, however, the spatial position determination is of subsidiary importance. More important is the issue of the best possible quality of the radio transmission. This means that another allocation might be effected due to screening or reflexions than would accord with the geographical position of the locations of the fixed-position radio stations.

Another type of position determination is effected with the GPS system. In this case, the signal from a number of fixed-position satellites in orbit is received by means of a GPS receiver, and the position of the receiver is determined from the difference in propagation times between the signals received.

An animal control system is known from WO 95/28691 A1. This system comprises a transmitter, which creates an electromagnetic field in an area from which the animal is to be kept away. The animal, in the drawing a dachshund, wears a collar with a transponder, an audible alarm which can be activated by the transponder, and an electric shock device. When the animal enters the electromagnetic field, this is detected by the transponder, which compares it with two threshold values. If an initial threshold value is exceeded, the audible alarm will first be activated, in order to warn the animal. If the animal ignores the audible alarm, and goes further, which is typical of dachshunds, the electric shock device will be activated when the second threshold value is exceeded. This should cause the animal to retrace its steps with alacrity. No location determination is provided for with this disclosure.

SUMMARY OF THE INVENTION

The invention is based on the objective of allowing for an unambiguous allocation of each transponder to cells of the detection area, on the basis of data transfer between a base station and at least one transponder.

This objective is attained in accordance with the invention with a system for the spatial allocation of at least one transponder to cells of a detection area, the cells of which differ from one another by changeable or permanently different properties of an electromagnetic field. The transponder receives the properties of the electromagnetic fields of the cells at its position individually, selectively, or as resultants. The properties are evaluated and the allocation to the cells is effected automatically in accordance with the characteristics of the individual electromagnetic fields received, the ratio of the proportions of the electromagnetic fields received selectively or as resultants, or the proportion predominant in the field strength of the electromagnetic fields received selectively or as resultants. Further developments and advantageous embodiments of the invention are discussed below.

For spatial allocation, it is sufficient if at least two cells are provided, which have electromagnetic field properties capable of being changed or permanently different. Capable of being changed in this context may mean that the properties are constantly changing, or that the properties are only different during a limited period of time, which serves, for example, for the detection process. The transponder evaluates the properties of the fields received. With non-overlapping fields, these are received and evaluated one after another. As long as the transponder is located in one of the fields, the different properties of the fields provide at least a rough indication of the position, in that the transponder remains in the cell which pertains to this field. It is also possible to derive a direction of movement from the sequence of fields into which the transponder has entered. Because of the constant or temporary difference between the fields, when the transponder enters a field from outside it is also capable of making an unambiguous allocation as to which field it has entered.

In the event of overlapping fields, a number of different situations may arise. If the fields have different frequencies, and if the transponder is equipped with several receivers, it is possible for several fields to be evaluated simultaneously. If the transponder is equipped with one receiver, it is likewise possible to monitor several fields if the fields are switched on or off respectively in the time multiplex, or if the frequency of the receiver is switched over.

It is also possible for the fields to be superimposed with the same or almost the same frequency, and therefore for the resultant of the superimposed fields to be evaluated by the receiver. The allocation of the transponder to the individual cells is then effected by the fact that the properties are compared between several selectively received fields. The allocation is determined in accordance with either the fraction which predominates in field strength, or from the proportions between the fractions. With a resultant field, the allocation is made on the basis of which fractions of the resultant fields predominate and are therefore capable of being reliably evaluated.

An evaluation becomes particularly simple and unambiguous if operations are being conducted with fields of the same frequency, and if the phase of the fields of adjacent cells differ by 180 degrees. The properties of the fields can in this case be varied to such a degree that, for the purpose of a position determination, for the duration of a measuring period the phase angle of the fields of some cells is switched over cyclically between 0 degrees and 180 degrees, while the phase angle of the fields of the other adjacent cells is retained. The transponder can then easily determine which cell it is located in, by evaluating the phases within the measuring period.

If the characteristics of the fields of the cells differ markedly, at least a rough indicative allocation is possible as to which cell the transponder is located in. A precise position would, by contrast, also make it necessary for the conditions of the field strengths of the individual fields to be evaluated.

Because the transponders carry out the allocation independently, in the simplest case no dialogue is required between the transponder and the base station. Rather, the presence of the electromagnetic fields is sufficient. As a result, it is also possible for several transponders, located simultaneously in the detection area, to determine their allocation to the individual cells simultaneously and independently of one another. Inasmuch as several response channels may pertain to the base station, the positions determined can be signaled to the base station simultaneously in the frequency multiplex or almost simultaneously in the time multiplex.

The solution according to the invention is in contrast to proposed solutions in which the evaluation is not effected directly in the transponder but rather by the base station alone, or in the transponder/base station dialogue. According to the invention, the speed of the position determination is independent of the number of transponders located in the detection area, and likewise independent of the data rate of the dialogue between the transponders and the base station.

According to a further embodiment, it is possible, with the same proportion of fractions of the electromagnetic fields received selectively or resultantly, or with an indefinite evaluation of the characteristics of the electromagnetic fields received resultantly, for this result to be evaluated as the limit between two adjacent cells.

This further embodiment in this case makes it possible, as a special case, for the position to be determined in a transition area of the fields of two adjacent cells. Because field strength drops off exponentially as distance from the transmitting antenna increases, a relatively narrow and sharply delineated area lies between adjacent cells (demarcation line), in which the field strength of the antennae allocated to the individual cells is the same.

If the properties of the fields can be evaluated independently of one another, this situation can be determined by a comparison of the fractions.

By contrast, with a resultant field, e.g. a field of an extinction, this leads to an indefinite evaluation. An unambiguous evaluation is no longer possible because the transponder may even be located outside the detection area of the base station. If the transponder has previously detected valid location data, and thereafter another valid item of location data is again detected by the transponder, this is a criterion for location in the limit area (demarcation line) between the cells.

Provision is further made for the results of the allocation to one of the cells and/or to the borderline between two adjacent cells to be internally stored in a memory. This makes it possible for the protocolled data to be transferred later to the base station or to an interrogating station, and to be evaluated there, or for an evaluation of a larger volume of data to be carried out in the transponder.

Accordingly, according to another embodiment, a statistical evaluation of the frequency of allocation to one of the cells and/or to the borderline between two adjacent cells can be carried out directly in the transponder. This evaluation is carried out before the measured position is signaled to the base station.

In this way, a type of filtering is possible; with which it is possible for erroneous position determinations in the transponder to be eliminated. This is a good idea if an alarm signal is linked to the position determination, and it is intended that false alarms should be avoided.

In the case of allocation to selected cells and/or to cells bordering on one another, a switching process may preferably be activated by the transponder which may take place immediately, after a delay, or after statistical evaluation. If it therefore possible both for every position determination to be signaled to the base station immediately or with a delay, or for a filtering effect to be instituted, capable of adjustment in its filter depth.

The transponder may also evaluate the sequence of the allocation to one of the cells and/or to the borderline between two adjacent cells. In a manner similar to a tachograph, this will allow for the determination of a movement profile and also a direction of movement to be determined.

It is then possible, when changing the allocation to selected cells and/or between mutually adjacent cells, to carry out a switching process by the transponder, in a specified sequence, immediately, delayed, or after statistical evaluation of frequency. The switching process may involve a local action, such as an optical or audible alarm, a deactivation of an electronic circuit, or the reduction of value or marking of value items.

These measures are particularly suitable for applications involving theft prevention of valuable items. For example, a cash or value instrument holder may be equipped with a transponder to release a marking substance or coloring agent. The marking substance or coloring agent will mark the cash or the value instruments or render them unusable as soon as they are removed from a security area without authorization. In the case of devices provided with electronic circuits, the electronic circuit can be deactivated so that it is rendered unusable without reactivation by means of an activation code.

In addition to this, or as an alternative, it is also possible to carry out a remote-control action by means of the switching process, via a signal line or by emitting a radio signal to at least one radio receiver. Corresponding actions, such as the issue of an alarm, can then be implemented by the base station.

It is also possible for the base station or a writing and/or reading ("write/read") device to activate the switching processes to be carried out in the transponder, to select the type of actions initiated, and/or to implement the writing or amendment of data in the memory of the transponder. In the simplest case, it is possible to omit communication from the transponder to the base station. For example a monitoring device for building entrances and exits the base station could use electromagnetic fields to create areas or a demarcation line at the exits to be protected. If passed by an unauthorized person, the electromagnetic field would actuate one of the functions described earlier.

If, for example, the owner of a notebook computer wishes to pass through the area of the demarcation line, without being challenged, he must arrange for his movements to be coded accordingly (e.g. released) before leaving his computer with the integrated anti-theft transponder. This can likewise be done by transferring a code by means of the base station or by means of a write/read device.

As a check, the transponder could send its number, in parallel with the function described above, to register whether the transponder is really passing the demarcation line (check-out). The same function is used in order to identify in this mode that a transponder has been brought back into the building again (check-in).

The changeable or permanently different properties of the electromagnetic fields may be formed by one of the parameters, or by a combination of the parameters, of field strength, inter-field phase, frequency, and modulation content. In principle, in this situation, all parameters are suitable for the purpose which will allow for a differentiation of the characteristics. In practice, it is useful to select one parameter or a combination of parameters which will allow for the most unambiguous possible differentiation, as well as being unaffected by interference. A further criterion for parameter selection lies in the fact that, apart from a Yes/No decision, additional analog identifier values are to be transmitted. These values make it possible not only to determine the peripheries of the fields and the demarcation line, but also to determine a relative position in the field itself.

The changeable properties of the electromagnetic fields can, if required, be dimensioned in such a way that a fixed or displaceable demarcation line is created between different cells. Due to the exponentially decreasing field strength, as the distance from the transmitter increases, a very narrow transitional area occurs between adjacent cells, which can be regarded as a demarcation line. By carrying out specific changes to the field strength conditions, this zone can be displaced in certain areas. Accordingly, if the locations where the antennae can be installed are restricted, the demarcation line can be altered, by means of electrical balancing and allocated to the desired position.

In one practical embodiment of the invention, the frequency of the electromagnetic fields serving to provide the spatial allocation of the transponders lies in the LF range of up to 150 kHz, and preferably between 8 kHz and 125 kHz.

This low operating frequency provides the system with a large penetration depth in materials. In addition, the homogeneity of the electromagnetic fields will only be slightly impaired by objects in the vicinity of the transmitting antennae. Accordingly, installation is also possible even in the immediate proximity of metal building elements. By contrast with high-frequency fields, no reflections occur, which could lead to undesirable and changing zero positions, or the increasing of the field strength. In addition, the fields are also hardly affected by objects introduced dynamically into the detection area, or deposited there. Moreover, screening for the purposes of manipulation is not effective, or only to a limited degree.

A frequency for signaling back from the transponder to a base station is located, to advantage, in the high frequency range, preferably above 10 MHz. The operating frequencies for transmission and reception are, as a result, so far apart from one another than duplex operation is possible without any interference effect. The high frequency for the return channel also has the advantage that the transponder only requires a very small antenna and low transmitting power. In addition, in the frequency range indicated, there is hardly any interference present due to switching processes from other electrical equipment or due to atmospheric effects, with the result that reliable data transfer can in most cases be guaranteed.

The high frequency does have the disadvantage, however, that the electromagnetic fields can very easily be screened or shielded. To compensate for this disadvantage, or, in the event of a transfer line suffering from interference in the high frequency range, the return signal frequency or an additional return signal frequency is located in the LF range of up to 150 kHz, preferably between 14 kHz and 125 kHz. In this way, signaling from the transponder to the base station may take place despite such screening or interference.

According to a further embodiment, each transponder, after a first or repeat entry into one of the electromagnetic fields of the detection area, may be assigned to a general response channel, by means of a code contained in the electromagnetic field of the base station. The response channel may take the form of a time slot and/or a frequency for a first or repeat identification.

In the first instance, then, systems channels suffering from interference, or engaged channels, can be excluded, which accordingly guarantees a rapid and reliable identification of the new transponders, or of the transponders re-entering the field. The code can also be linked to the location identification marker of the cells, or to other data from the base station.

It is also advantageous if each transponder, after a first or repeat entry into one of the electromagnetic fields of the detection area, transmits an individual identifier to the base station, and the base station then assigns the transponder an unambiguous channel for return signals.

This has the advantage that several transponders can selectively transmit return messages regarding their position to the base station. The position then can be determined unambiguously via the channel from which transponder the return signals are coming.

The channel for return signals may be formed by a time window and/or a frequency channel within the frequency range reserved for return signals. If several frequency channels are available, simultaneous return signals from several transponders are possible. This makes it possible, even with low individual data rates, for the entire data throughput to be increased.

After the allocation of a return channel, each transponder may be adapted to transmit data regarding its spatial allocation in relation to the cells of the detection area. Transmission may be done on a regular basis or at the request of the base station. As a result, an ordered data transfer is possible, which allows for a plurality of transponders to be managed simultaneously in the detection area. Collisions, i.e. simultaneous and futile transmissions by several transponders, will be avoided. Accordingly, the limited energy sources of the transponders will be protected from premature exhaustion.

It is also possible for every transponder, at the request of the base station or of a write/read device, to transmit additional identification data and/or situation data and/or data from its memory content to the base station or to the write/read device.

In this way, correction data, for example, may be interrogated. In addition, manipulations involving attempted changes to the entitlement data may likewise be detected. A check on the battery voltage is also possible, in order to be able to indicate the need for replacement in good time.

A further security measure can be provided by having at least one HF receiver monitor the transmission path in the high-frequency range between the transponder and the base station. In this way, in the event of an interruption to the transmission path in the high-frequency range from the transponder to the base station, a return signal may be sent in the LF range.

This arrangement makes it possible for a fault in the transmission path in the high-frequency range to be identified in good time, i.e. already shortly after a transponder has entered the detection area, and for this to be signaled if necessary.

In one embodiment, the transponder is installed in the housing of an electronic device which is to be monitored. The transponder is connected to the electronic circuit in such a way that conditions and/or data stored in the electronic circuit can be read out, and can be transferred to the base station by means of the transponder, and/or conditions of the electronic circuit can be set by the base station via the transponder, and/or data can be written in and stored in memory.

With this very close mechanical and electrical connection between the transponder and the electronic circuit, attempts at manipulation are very difficult and not possible without expert knowledge. In addition to this, a direct data exchange between the transponder and the electronic circuit is possible, and, if required, existing hardware and software resources can be used jointly.

The invention further relates to a base station for a system. In this respect, the invention is based on the objective of creating a base station which will allow for the unambiguous allocation of a transponder to cells of the detection area.

This object is resolved by having at least two spatially separated transmitter devices which create electromagnetic fields with changeable or permanently different properties. With regard to mode of effect and advantages, reference is made to the explanations in connection with the description of the system.

According to a further embodiment, the transmitter devices are synchronized by a control device. This makes it possible for the desired field properties to be maintained with a high degree of precision, which is of importance for the reliability of the determination of the position.

The base station may, in addition, comprise reception devices and an evaluation device associated with these. This arrangement increases the reliability of the data transfer from the transponder to the base station by avoiding the effect of screening, local interference, or interference on one of the usable frequencies.

Finally, the invention relates to a transponder for a system. In this respect, the invention has the objective of creating a transponder which will allow for an unambiguous allocation to cells of the detection area.

This objective is resolved by a transponder comprising at least one receiver device for the electromagnetic fields radiated by the base station and an evaluation device. Further embodiments are discussed below.

With regard to mode of effect and advantages, reference is made to the explanations in connection with the description of the system.

According to the invention, a transmitter device capable of being controlled by the evaluation device of the transponder may also be provided for issuing a reply to the base station.

This transmitter device allows for duplex communication between the transponder and the base station, and so expands the monitoring potential of the transponder.

BRIEF DESCRIPTION OF THE DRAWINGS

Other objects and features of the present invention will become apparent from the following detailed description considered in connection with the drawings which disclose preferred embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
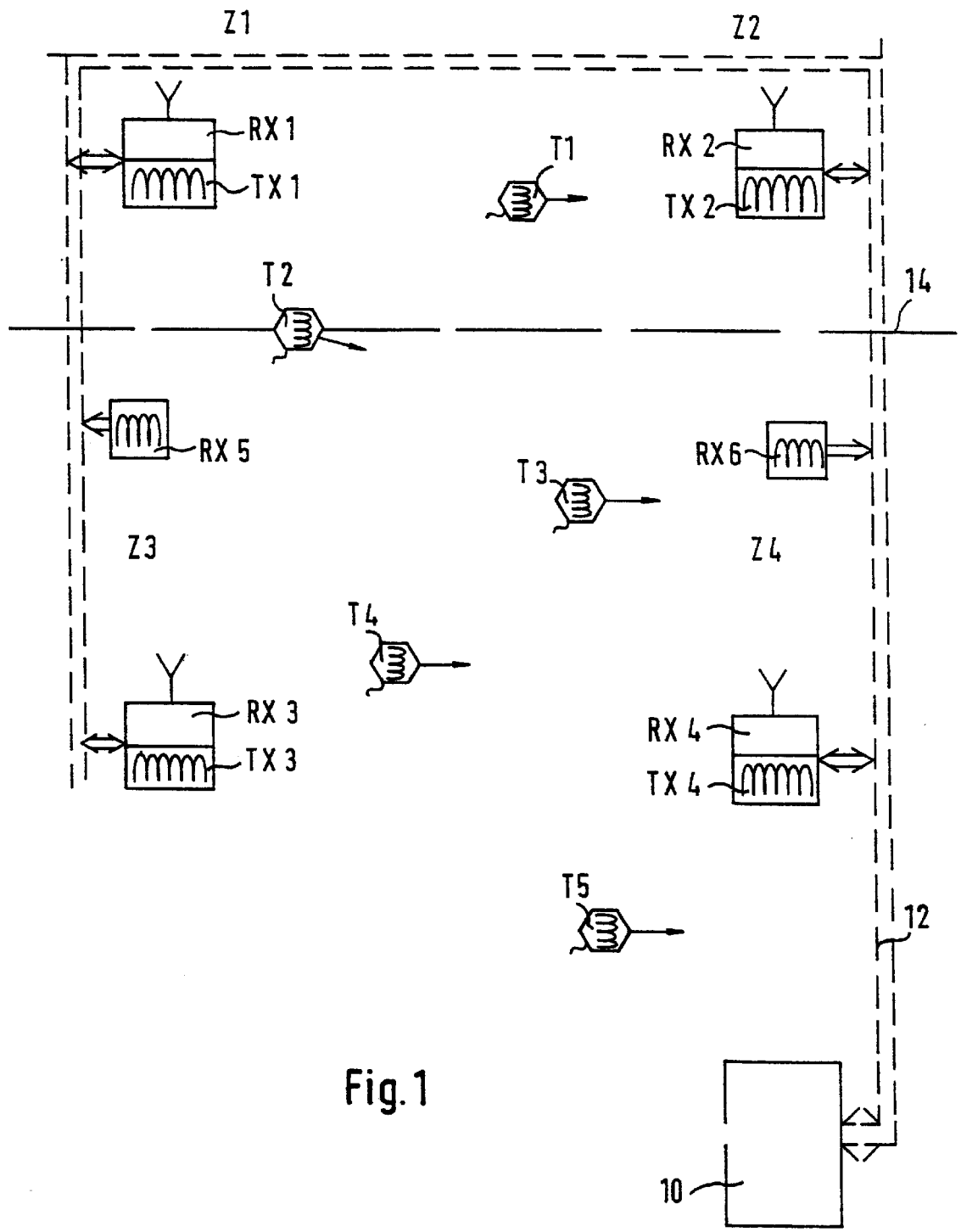
FIG. 1 is schematic representation of a detection area, with a total of four cells, in which the transponder is located.

FIG. 1 shows a schematic arrangement of a detection area of a total of four cells, Z1, Z2, Z3, Z4, in which transponders T1, T2, T3, T4, T5 are located. In this situation the four cells Z1, Z2, Z3, Z4 are controlled by a common base station 10. Although the invention can also be implemented with two cells, four cells offer better surface coverage of the detection area, with low transmitting power per cell.

An example of application could be the entrance and exit area of a service company, which employs not only internal service personnel but also external service personnel, who use notebook computers to fulfil their tasks, and which they can take out of the building.

To monitor the permissible and impermissible removal of the computers, all devices are fitted with transponders T. Transponders T are provided with a receiver operating in the LF range up to 8 kHz, an evaluation and control circuit, a transmitter operating in the HF range up to 433 MHz, and an additional transmitter operating in the LF range up to 14 kHz, as well as receiving and transmitting antennae. The evaluation and control circuit of each transponder K is provided with a memory, in which an individual identifier indicator is stored.

Located in the entrance and exit area of the building is a detection area, which is formed by four cells Z1, Z2, Z3, Z4. The cells represent in this context the electromagnetic fields, which are capable of being received, of transmitter devices TX1, TX2, TX3, TX4, with antennae. The cells are spatially separated at four points in the ceiling of the entrance and exit area of the building, and are connected to a common base station 10. In addition, several receiver devices RX1, RX2, RX3, RX4 for the HF range are provided, with reception antennae, and further reception devices RX5, RX6 for the LF range, which are likewise connected to the base station 10.

The transmitter devices TX1, TX2, TX3, TX4 are synchronized with the base station 10 via a data bus 12, and transmit electromagnetic fields in the LF range, at about 8 kHz. The electromagnetic fields differ from one another in the four cells Z1, Z2, Z3, Z4. In the simplest case, the difference arises from the ability to displace temporarily in phase the electromagnetic fields of adjacent cells in relation to the phase of the other fields. It is also possible, however, for the fields to be marked with an individual identifier, which is characterized by amplitudes, frequency, phase parameters, or by the contents of a modulation.

The receiver devices RX1, RX2, RX3, RX4 for the HF range, which scan several reception channels and transmit the results to the base station, are advantageously located at the same antennae locations. By contrast, the receiver devices RX5, RX6 for a second return channel in the LF range are located at a distance from the transmitter devices TX1, TX2, TX3, TX4, in order to achieve the greatest possible decoupling, and thereby low direct scatter.

If an employee were now to take a computer which is connected to a transponder of this type, T1 . . . T5, into the detection area of the entrance and exit area of the building, the transponder T will pass into the field of one of the cells Z1, Z2, Z3, Z4 of the detection area. By means of the receiver device, the transponder will activate the evaluation and control device. The control device then causes a return response to be issued in the HF range, with the full identifier of the transponder T. When this is received and evaluated by the base station 10, one of several return channels, e.g. time slots and/or frequencies, will be allocated to the transponder T. Transponder T will also be switched into a state in which it will only respond in the channels assigned by the base station, and, as a rule, will also only do this at the request of the base station 10, or after synchronization by the base station 10.

The field strength of the transmitters of the allocated cells Z1, Z2, Z3, Z4 of the base station 10 is adjusted in such a way, for example by deleting phase-opposed fields, that a demarcation line 14 is formed between two pairs of cells Z1, Z2, Z3, Z4. This demarcation line 14 represents the separation between an inside permissible place to remain, and an outside area, which is not permissible for transponders which do not have legitimation. If a transponder T crosses the demarcation line from the inside area to the outside area, this will be signaled to the base station 10. If the transponder T is not entitled to do this, an alarm will be actuated.

Notebook computers moving from one office to another, for example, will be moving with their transponders T only in the inside area. Although the transponders will indeed be registered in the inside area by the base station 10, they will not actuate any alarm.

Each transponder T1, T2, T3, T4, T5, carries out the evaluation of the electromagnetic fields independently and automatically. This evaluation is necessary to determine the area in which the computers may remain, namely the fields of the cells Z1, Z2, Z3, Z4. As a result, it is also possible for several transponders T1, T2, T3, T4, T5, to be able to determine simultaneously when they are brought over the demarcation line. All that is then necessary is for the return signals to be selected which will initiate the alarm. A simple status message will be sufficient for this, however, with the result that there is no need for a high data rate. The return signal can be implemented in the HF range by one of the receiver devices RX1, RX2, RX3, RX4, or via one of the receiver devices RX5, RX6.

It is possible to establish a sabotage monitoring arrangement, if, for example, the operational frequencies for the cells, the return channel, or the HF range, are monitored at regular intervals for interference transmissions.

Instead of an alarm being issued, it would also be possible for the transponders T to operate without return channels, and, by means of an intervention into the electronic circuit of the device to be monitored, for them to be deactivated. Reactivation would then only be possible by means of an activation code, which would only be accessible to entitled persons.

Figure 2:
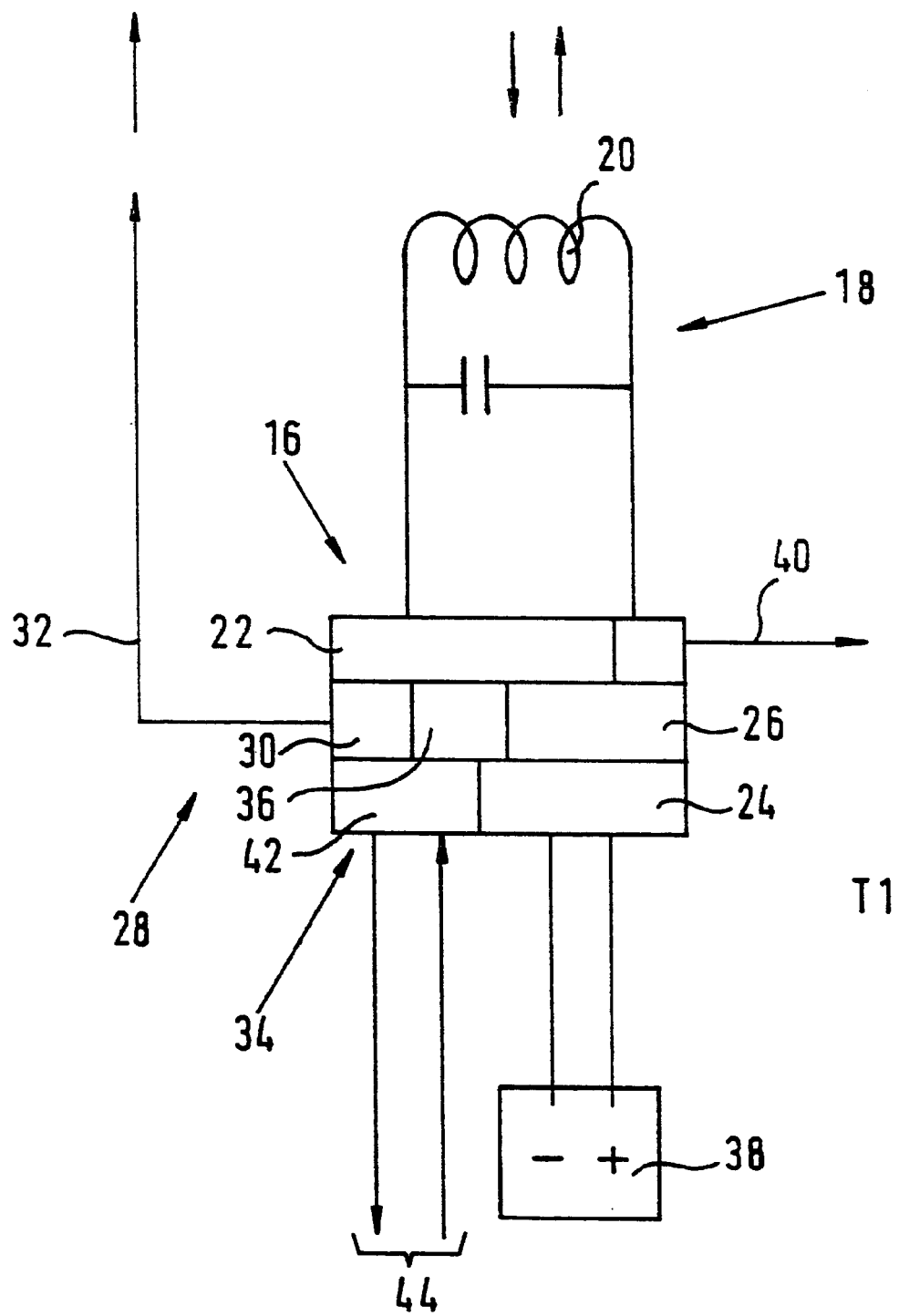
FIG. 2 is block circuit diagram of a transponder.

FIG. 2 shows a block circuit diagram of a transponder T1 suitable for the system described. This comprises a receiver device 16 for an operating frequency of 8 kHz, consisting of a parallel resonance circuit 18 with a coil 20, serving simultaneously as an antenna, and a receiver 22, an evaluation and control circuit 24 with a memory 26, a first transmitter device 28, consisting of an HF transmitter 30 for 433 MHz, and an antenna 32, a second transmitter device 34, consisting of an LF transmitter 36 for 14 kHz, and the coil 20 of the existing parallel resonance circuit 18 as an antenna, supplemented by ultrasonic media for the other frequency, and an energy source 38. The evaluation and control circuit 24 has an output 40 for actuating an optical or audible signal generator, or a device for marking, rendering invalid, or blocking of items of value. This arrangement can be supplemented by an interface 42 with an input and output port 44 for an electronic device, which can communicate with the transponder via a software/hardware protocol.

It is possible, in the application instance of a notebook computer, for the transponder to be integrated in the computer itself, and, for example, to activate or deactivate the BIOS. In this case, it would be to advantageous to use the standard fitted battery of the computer, such as the battery for the clock. In addition, all the components of the transponder can be arranged on the common CPU board in the computer.

In this embodiment, the transponder would communicate both via a wire interface to the CPU board, as well as via the wireless media already described to the base station, or to other writing and/or reading devices. Other appliance characteristics, such as serial number and fittings, can then also be transmitted.

While several embodiments of the present invention have been shown and described, it is to be understood that many changes and modifications may be made there unto without departing from the spirit and scope of the invention as defined in the appended claims.

What is claimed is:

1. A spatial allocation system comprising:

(a) a detection area comprising a plurality of cells, the cells differing from one another by changeable or permanently different properties of an electromagnetic field;

(b) at least one transponder for receiving individually, selectively or as resultants the properties of the electromagnetic fields of the cells at the position of said transponder and for evaluating the properties and spatially allocating said transponder to the cells, said transponder comprising a memory for storing the results of the allocation and means for statistically evaluating the frequency of each allocation result, wherein upon each allocation the transponder initiates a switching process immediately, after a delay, or after statistical evaluation of the frequency, and wherein the frequency for return signals from the at least one transponder to a base station lie in the HF range;

(c) a station for activating the switching process in the transponder, for selecting the nature of an action initiated by the switching process, or for the input or modification of data in the memory of the transponder;

(d) whereby the spatial allocation is effected automatically in accordance with a parameter selected from the group consisting of (i) the characteristics of the individual electromagnetic fields received, (ii) the ratio of the proportions of the electromagnetic fields received selectively or as resultants, and (iii) the proportion of the electromagnetic fields received selectively or as resultants having the predominant field strength.

2. The system according to claim 1 wherein the system evaluates electromagnetic fields received selectively or as resultants as a delimitation between two adjacent and overlapping cells where the electromagnetic fields of said two cells have the same ratio of proportions.

3. The system according to claim 1 wherein the system evaluates the characteristics of electromagnetic fields received as resultants, as a delimitation between two adjacent and overlapping cells where an evaluation between a first valid position determined by the system prior to the evaluation and a second valid position determined by the system after the evaluation does not unambiguously lead to a spatial allocation of the transponder to one of the cells.

4. The system according to claim 1, wherein the transponder evaluates the sequence of each allocation result.

5. The system according to claim 4, wherein upon a change of allocation the transponder initiates in a specified sequence, a switching process immediately, after a delay, or after statistical evaluation of the frequency.

6. The system according to claim 1 wherein the switching process effects a local action selected from the group consisting of an optical or audible alarm, a deactivation of an electronic circuit, the rendering invalid of objects of value, and the marking of objects of value.

7. The system according to claim 6, further comprising means for carrying out remotely controlled action selected from the group consisting of a signal line and at least one radio receiver and wherein by the switching process, the remotely controlled action is carried out via the signal line or by transmission of a radio signal to the at least one radio receiver.

8. The system according to claim 1, wherein the changeable or permanently different properties of the electromagnetic fields are selected from the group consisting of field strength, interfield phase, frequency, modulation content, and combinations thereof.

9. The system according to claim 8, wherein the changeable properties of the electromagnetic fields can be adjusted to create a fixed or displaceable demarcation line between different cells.

10. The system according to claim 1, wherein the frequencies of the electromagnetic fields serving to provide the spatial allocation of the at least one transponder lie in the LF range up to 150 kHz.

11. The system according to claim 1, wherein the frequency for the return signal from the transponder to the base station or an additional return signal frequency lies in the LF range up to 150 kHz.

12. The system according to claim 1 wherein the station is a base station having an electromagnetic field, said electromagnetic field containing a code for allocating each transponder to a general response channel, and each transponder, after a first or repeated entry into one of the electromagnetic fields of the detection area is allocated by the code to the channel, the allocation having a form selected from the group consisting of a time slot and a frequency for a first or repeated identification.

13. The system according to claim 1 wherein the station is a base station and each transponder, after a first or repeated entry into one of the electromagnetic fields of the detection area, sends an individual identification marker to the base station and the transponder is then allocated an unambiguously channel for return messages by the base station.

14. The system according to claim 13, wherein the channel for return messages is formed by a time window or a frequency channel within the frequency range reserved for return messages.

15. The system according to claim 12, wherein each transponder after the allocation of a return channel, sends to the base station, regularly or at the request of the base station, data relating to its spatial allocation to one of the cells.

16. The system according to claim 15, wherein each transponder, at the request of a station selected from the group consisting of the base station and a writing or reading station, sends to the station data selected from the group consisting of additional identification data, status data, and data relating to the memory content of the transponder.

17. The system according to claim 1 further comprising at least one HF receiver monitoring the transfer path in the HF range between the transponder and the base station, and in the event of an interruption of the transfer path in the HF range, a return message is sent in the LF range by the transponder to the base station.

18. The system according to claim 1, wherein the transponder is installed in the housing of an electronic device which is to be monitored, the electronic device having an electronic circuit, said transponder being connected to the electronic circuit in such a way that (i) conditions or data stored in the electronic circuit can be read out and transferred by means of the transponder to the base station or (ii) conditions of the electronic circuit can be set or data can be written in and stored in memory by means of the base station via the transponder.

19. The system according to claim 1 further comprising a base station and at least two spatially separated transmitter devices, said transmitter devices creating electromagnetic fields with changeable or permanently different properties.

20. The system according to claim 19, further comprising a control device synchronizing the transmitter devices.

21. The system according to claim 19 further comprising a plurality of receiver devices and an evaluation device connected to the receiver devices.

22. The system according to claim 1 wherein the transponder comprises at least one receiver device for electromagnetic fields radiated by a base station and an evaluation device.

23. The system according to claim 22, further comprising a transmitter device for the response to the base station, said transmitter device being controlled by the evaluation device.

* * * * *

UNITED STATES PATENT AND TRADEMARK OFFICE
CERTIFICATE OF CORRECTION

PATENT NO.     : 6,535,744 B1                                      Page 1 of 1
DATED          : March 18, 2003
INVENTOR(S)    : Stobbe et al.

It is certified that error appears in the above-identified patent and that said Letters Patent is hereby corrected as shown below:

<u>Title page,</u>
Item [30], Foreign Application Priority Data, should read:
-- December 28, 1998   (DE) ………………….. 198 59 947.1 --.

Signed and Sealed this

Sixteenth Day of September, 2003

JAMES E. ROGAN
*Director of the United States Patent and Trademark Office*